United States Patent
Baer

[15] 3,637,056
[45] Jan. 25, 1972

[54] SELECTIVELY DISENGAGEABLE HELICAL SPRING CLUTCH

[72] Inventor: John S. Baer, Medford Lakes, N.J.
[73] Assignee: Warner Electric Brake & Clutch Company, South Beloit, Ill.
[22] Filed: July 22, 1970
[21] Appl. No.: 57,044

[52] U.S. Cl. ........................... 192/12 BA, 192/35, 192/81 R
[51] Int. Cl. ................................................. F16d 67/02
[58] Field of Search ............... 192/12 BA, 35, 36, 26, 81 C, 192/81 R

[56] References Cited

UNITED STATES PATENTS

| | | | |
|---|---|---|---|
| 2,510,653 | 6/1950 | Pepper | 192/81 C |
| 2,523,772 | 9/1950 | McGibbon et al. | 192/35 |
| 2,588,751 | 3/1952 | McCain | 192/81 C |
| 2,976,976 | 3/1961 | Parker | 192/12 BA |

Primary Examiner—Benjamin W. Wyche
Assistant Examiner—Randall Heald
Attorney—Wolfe, Hubbard, Leydig, Voit & Osann

[57] ABSTRACT

A helical clutch spring is attached one end to the output hub and at its other end to a collar and lies opposite a cylindrical clutch surface of an input hub. The clutch spring tends to be normally out of engagement with the clutch surface. However, by virtue of resilient means urging a surface on the collar into an opposed surface on the input hub, the rotation imparted to the collar causes the spring to engage the input hub and drive the output hub through the spring. Actuator means may be selectively caused to act upon the collar to draw it in opposition to the resilient means away from the input hub and allow the spring to return to its normal position and the clutch to disengage.

10 Claims, 10 Drawing Figures

PATENTED JAN 25 1972 3,637,056

INVENTOR:
JOHN S. BAER
BY
Howson & Howson
ATTYS.

PATENTED JAN 25 1972

INVENTOR:
JOHN S. BAER
BY Howson & Howson
ATTYS.

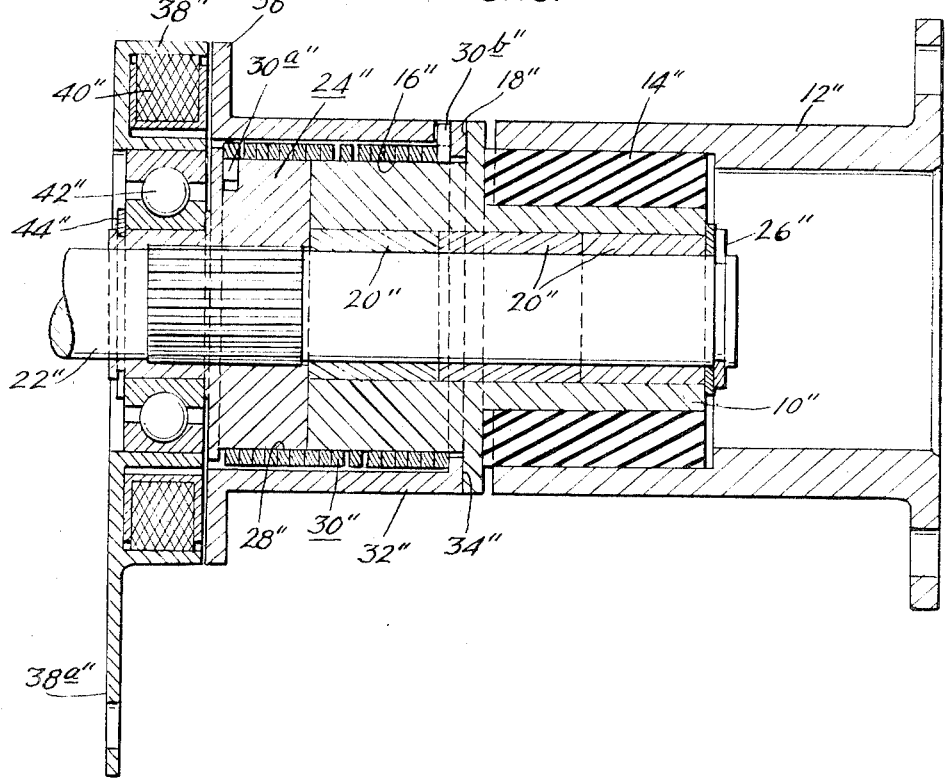

SELECTIVELY DISENGAGEABLE HELICAL SPRING CLUTCH

The present invention relates to a clutch which has the positive driving features of a helical spring clutch, but which has the advantage that it can gradually engage a load by its inherent construction. More specifically, the clutch is a helical spring clutch capable of selective disengagement.

In some applications it is highly desirable to have a clutch which may be gradually engaged so that the helical clutch does not carry the whole load at once. The present invention permits the clutch to be gradually engaged by allowing its actuating collar to be turned by the rotating input to the position in which the spring engages.

The clutch structure of the present invention employs an output hub to which one end of a helical clutch spring is attached and an input hub adjacent the output hub, which input hub has a cylindrical clutch surface concentric with and engageable by at least a portion of the helical clutch spring. A collar is attached to one end of the clutch spring remote from the end attached to the output hub. The collar is provided with a surface opposed to a surface on the input hub in a direction parallel to the axis. Resilient means acts between the output hub and the collar to urge the collar into the input hub. Contact with the rotating input hub by the collar will cause the clutch spring to move into contact with the cylindrical clutch surface of the input hub, whereupon the input hub drives the output hub. Clutch disengagement means is provided which is selectively actuatable upon the collar to move the collar away from the input hub in opposition to the resilient means and thereby ;isengage the clutch.

Preferably the opposed surfaces on the collar and the input hubs are the planar ring-shaped areas. Preferably the clutch disengagement means is electromagnetic means acting upon the portion of the collar providing a magnetic armature to draw the collar away from the hub. Also preferably the same helical clutch spring may serve a secondary function of providing the resilient means acting between the output hub and the collar to urge the collar into the input hub.

For a better understanding of the present invention reference is made to the drawings in which FIG. 1 is an axial sectional view of a preferred embodiment of the present invention showing the clutch disengaged;

FIG. 10 is a view similar to FIG. 1, showing modifications to the clutch structure of FIG. 1.

Figure 1:
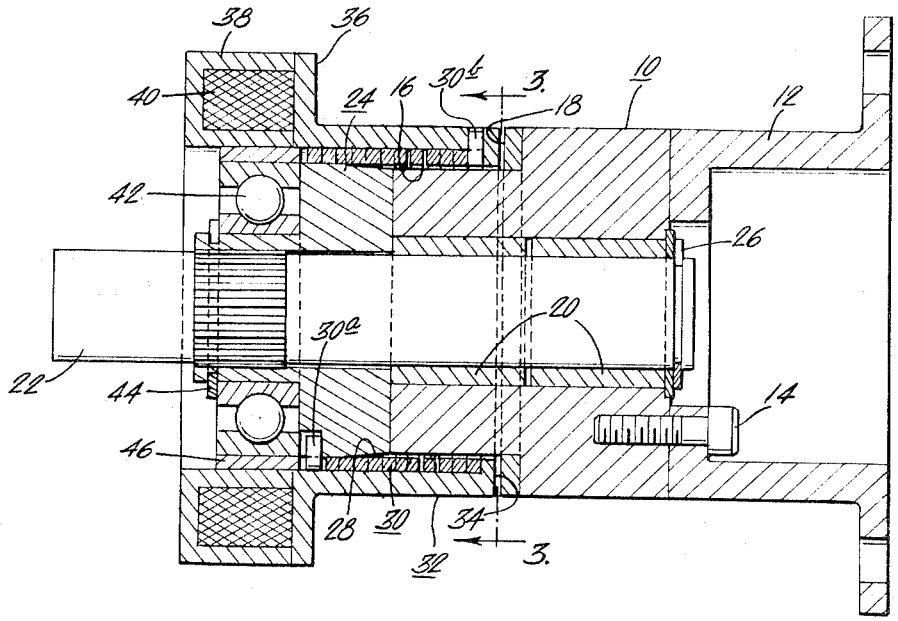

Referring to FIGS. 1–4, it will be seen that the clutch employs an input hub 10 which is provided with coupling means 12 for coupling it to an input member to impart rotation. Coupling means 12 may be attached to hub 10 by bolts 14 or other appropriate means. The input hub is provided with a cylindrical clutch surface 16. It is also provided with an annular planar contact surface 18 whose function will be described hereafter. The input hub 10 is provided with a sleeve bearing 20 which engages shaft 22 relative to which the input hub 10 rotates. Press fitted onto the shaft 22, over splines thereon, is an output hub 24. The input hub is held on the shaft 22 against output hub 24 by means of snapring 26. Helical clutch spring 30 is provided with a radially inwardly directed tang 30a fixing one end of the helical clutch spring to the output hub. Preferably, as shown, the helical clutch spring 30 surrounds and engages a cylindrical clutch face 28 of the output hub. Clutch spring 30 also surrounds input hub 16, but, as shown in FIG. 1, is provided with inherent resiliency which causes it to assume a position normally out of engagement with the clutch surface. The end of the spring 30 opposite from that attached by tang 30a to the output hub is attached by radially outwardly directed tang 30b engaged in a slot in the control collar 32. Control collar 32 may also provide a housing for the clutch spring 30 to prevent, or limit its outward expansion.

Figure 2:
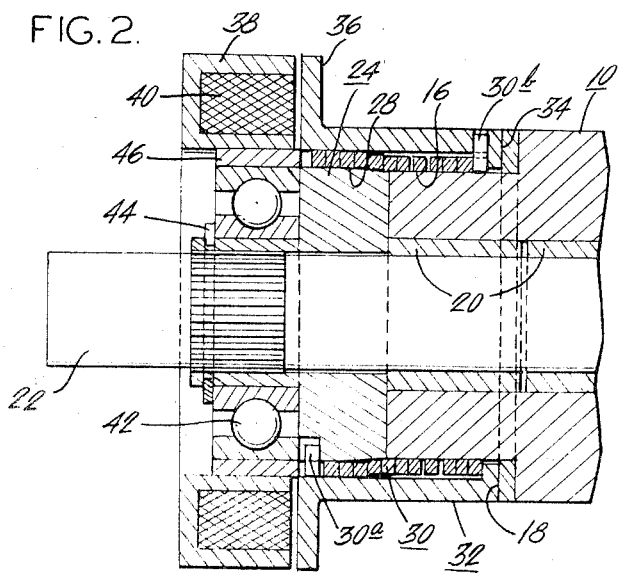
FIG. 2 is a similar view showing the clutch engaged.
Figure 3:
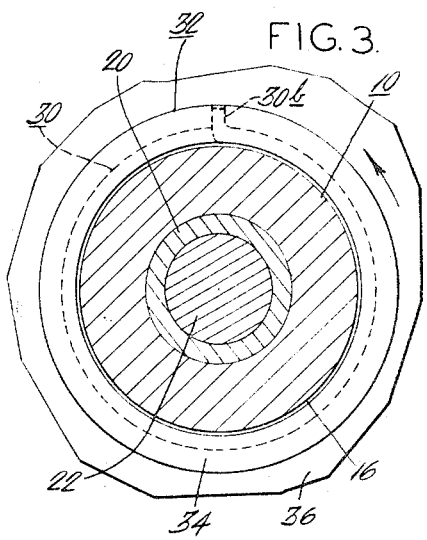
FIG. 3 is a sectional view taken along line 3—3 of FIG. 1.
Figures 4, 5:
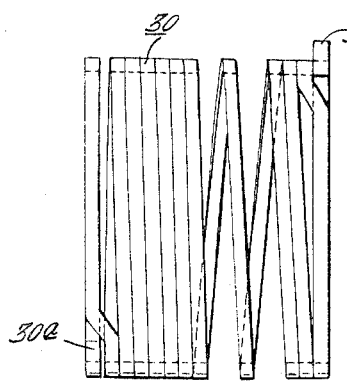
FIG. 4 is a side elevational view of the clutch spring employed in the clutch of FIGS. 1–3.
FIG. 5 is a partial view of alternative mechanical arrangement replacing the electromagnetic means shown in FIGS. 1 and 2.

As seen in FIG. 4, the helical spring clutch 30 is provided with axial resiliency by making the spring so that in its relaxed condition it appears as in FIG. 4 with at least some of its adjacent turns separated. When assembled in the structure of FIGS. 1–3 the coils are compressed together, or almost together, and as a result there is an axial pressure between tangs 30a and 30b, which tends to urge annular ringlike face 34 of collar 32 into opposed annular face 18 on the input hub 10, as shown in FIG. 2. The spring is of such hand that, when face 34 contacts face 18 the drag imposed by the input hub 10 on the collar 32 will cause the spring 30 to move into contact with the cylindrical clutch surface 16 of the input hub 10, as shown in FIG. 2 by wrapping down or coiling more tightly in opposition to its natural resilience. In contact with both input hub 10 and output hub 24, the clutch spring 30 becomes the positive drive between the input and output hubs causing the output hub to move with the input hub without slippage.

The collar 32 is also provided with an annular radially outward extending flange 36, which, being made of magnetic material provides an armature for an annular trough shaped, magnetic core 38, having an electromagnetic winding 40 contained within U-shaped cross section of the core. The trough core opens axially to one side opposite the magnetic flange armature 36 of collar 32. Thus, when the winding 40 is energized, a magnetic field is generated in the core 38 which draws the armature 36 to it, thereby disengaging the annular surface 34 of the collar from the opposed surface 18 of the input hub 10. Upon disengagement of these two surfaces the drag provided which causes the spring 30 to wrap down is removed and the internal resilience of the spring 30 will cause it to expand outwardly. Thus by selectively energizing the magnetic winding 40, using suitable switch means, or the like, which connects it to an energy source, the magnet is energized to draw the armature flange 36 to it in opposition to the spring 30 in order to release the clutch. The electromagnetic means 38–40 may be supported stationary relative to the rotating structure by suitable means (not shown) attaching it to a frame, in which case it is preferably supported from the shaft by suitable bearing means 42, preferably ball bearing means, as shown. The interrace of the bearing 42 is held in place by a snapring 44 relative to the output hub on which it is supported and over which it snugly fits. The outer-race of bearing 42 is attached by suitable intermediate means 46 to the annular U-shaped magnetic core structure 38.

Referring now to FIG. 5, the structure as shown is in all respects similar to the structure of FIG. 1, except that instead of an electromagnetic means, there is mechanical means acting as clutch disengagement actuator means. Most parts correspond to those of the structure of FIG. 1 and have been given similar number designators. Thus flange means 36' of the collar 32' here provides a shoulder, instead of an armature, which is acted upon in a similar way to urge the annular surface 34 away from the opposed input hub surface 18. While the mechanical means employed in practical structure would probably be more elaborate, it could be as simple as lever 50, which is pivotally supported by a pin 52 on a frame stationary with respect to the rotating structure. Although it is not essential to the operation, it may be desirable to provide stop means 54, as shown, extending from the output hub 24' radially outwardly or alternatively, a stop for the lever 50. Stop shoulder 54, rotates with the output hub so that no bearing like 42 is required. In all other respects the structure is similar to and operates in exactly the same manner as that of FIGS. 1–4.

Figure 6:
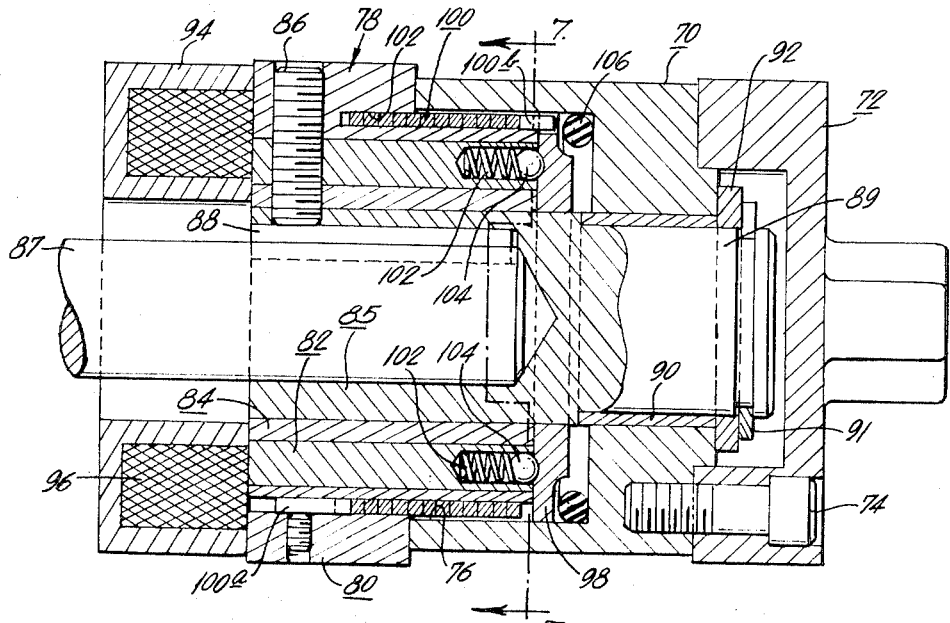
FIG. 6 is an axial sectional view showing an alternative form of the present invention.
Figure 7:
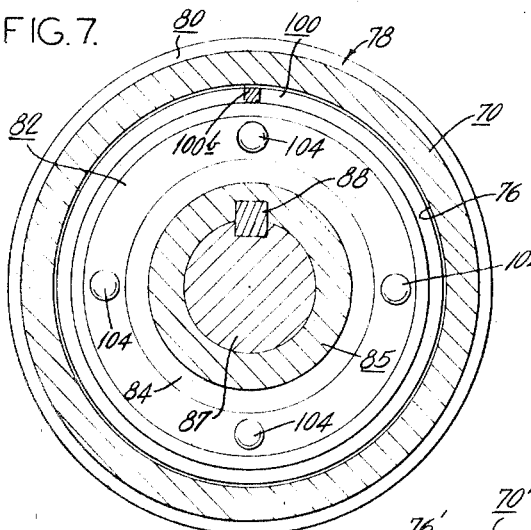
FIG. 7 is a sectional view taken along line 7—7 of FIG. 6.
Figure 8:
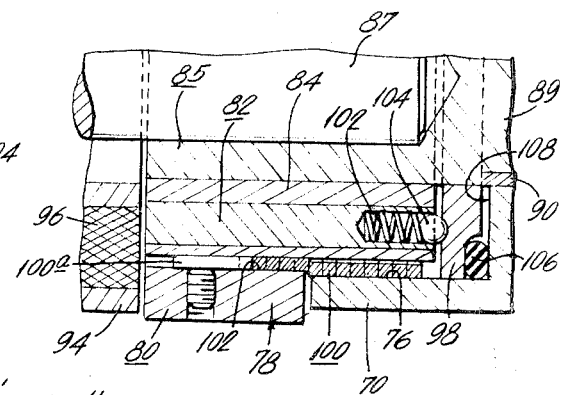
FIG. 8 is a detailed view showing a part of the section of FIG. 6 with the clutch engaged.

Referring now to FIGS. 6 to 8, an alternative arrangement is shown wherein separate resilient means are used to urge the collar axially into the input hub instead of using the helical clutch spring for the dual purpose. This structure is substantially different in several respects and hence will be described with new number designators.

Generally cylindrical input hub 70 has an input coupling 72 fixed to it by bolts 74, or the like. The input hub 70 has an internal cylindrical clutch engaging surface 76 provided by counter boring the input hub. The output hub 78 in this instance is a multilayered configuration. The outer layer 80 is composed of magnetic material. The next layer 82 is composed of nonmagnetic material. The next layer 84 is composed of magnetic material and the innermost layer is composed of nonmagnetic material 85. The concentric layers may be held together by screw means 86 and the output hub 78 as a whole is fixed to the output shaft 87 by a key 88. The input shaft is extended by cylindrical extension 89 within the input hub 70 and the input hub is provided with sleeve bearing 90 on which it is rotatably supported by the extension 89. The input hub 70 is held in place by snapring 91 engaging extension 89 and separated from input hub 70 by washer 92.

It will be observed that the magnetic layers 80 and 84 extend the concentric inner and outer sidewalls of magnetic annular trough-shaped magnetic core 94 axially. The core 94 supports the electromagnetic winding 96 which is selectively energized to draw the planar collar member 98 as an armature toward the ends of magnetic layers 80 and 84. Collar member 98 because of its planar shape does not surround the helical clutch spring 100. Collar 98 functions both as an armature across magnetic layers 80 and 84 and also in the helical spring control friction. Spring 100 is engaged in a confining annular slot 102 and has its axial end tang 100a held in a hole in the output hub. Its other end is provided with an axial tang 100b, which engages a slot in the collar 98.

When the electromagnetic winding 96 is energized, collar 98 is drawn into contact with the end of input hub 78, closing the gap in the magnetic circuit. In doing so, the magnetic force overcomes the spring force provided by four similar springs 102 in axial holes in layer 82, equally spaced around that layer, which, in turn, urge balls 104 against detents in annular collar 98. When the selectively energizable magnetic field 96 is released the springs 102 urge the balls 104 into collar 98, which, in turn, urges the collar 98 against an O-ring 106 as seen in FIG. 8. The flattened O-ring 106 is squeezed between the collar 98 and surface 108 of the input hub 70. The motion thus imposed upon the collar 98 by input hub 70 causes collar 98 to rotate, thus causing the spring 100, which is normally wrapped in, away from clutch surface 76, to expand and contact the clutch surface 76 as seen in FIG. 8. Thereafter the input drives the output hub through the clutch spring 100.

Figure 9:
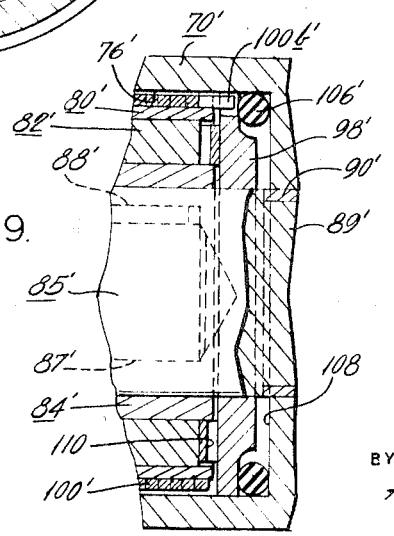
FIG. 9 is a partial sectional view showing a modification of the structure of FIG. 6.

FIG. 9 shows a modification of the structure of FIGS. 6–8, wherein instead of helical coil springs 102 and balls 104, a corrugated ring spring 110 is substituted. Similar parts in other respects are the same as in FIGS. 6–8, and are therefore given the same numbers with addition of primes thereto.

FIG. 10 is a modification of the structure of FIG. 1 and is a structure very similar to that of FIG. 1. In fact, the similarities are so great that corresponding numbers have been used with the addition of double primes thereto to distinguish the moderate differences which exist.

The input hub has a slightly different type of coupler 12", which is connected to the input hub 10" through the intermediary of a rubber insert shock absorber 14", which is bonded to each and provides a certain amount of shock resistance, or shock-absorption capability. The means of actually attaching the magnetic structure to the frame is shown in this embodiment as an arm 38a", which may be bolted or otherwise fixed to the machine frame. The cylindrical clutch surface 16" of input hub 10" and the cylindrical clutch surface 28" of output hub 24" are arranged so that there is normally no interference when the clutch is disengaged. In FIG. 10 the clutch is shown engaged with the drag clutch face elements 18" and 34" whereby because of the hand of spring 30" the drag imposed upon the collar 32" causes the clutch spring 30" to wrap down into contact with said input and output clutch surfaces. It will be understood that in this structure, as in that of FIG. 1, when the winding 30" is energized the flange 36" will be drawn toward the annular core 38" to reduce the reluctance gap whereby the face 34 is withdrawn from face 18, so that the drag therebetween is no longer present and the clutch spring, through its inherent resiliency is caused to unwrap away from the clutch surfaces.

Several modifications of the present invention, including devices wherein the helical clutch spring serves also as the axial spring means have been shown. Modifications in which the clutch springs acts inwardly and alternatively acts outwardly have been shown. Modifications in which the collar is tubular, and alternatively in which it is planar, have been shown. A modification has been shown in which the electromagnetic clutch disengagement actuator means has been replaced by mechanical means. It will be clear that many other modifications to the structure are also possible within the scope of the present invention. All such modifications are intended to be within the scope and spirit of the present invention.

I claim:
1. A clutch structure having
a rotatable output hub,
a helical clutch spring attached at one end to the output hub,
an input hub rotatable about the axis of rotation of the output hub, adjacent the output hub and having a cylindrical clutch surface concentric with and engageable by at least a portion of the helical clutch spring,
a collar attached to the end of the clutch spring remote from the end attached to the output hub, said collar having a surface opposed to a surface on the input hub in a direction parallel to the axis of rotation,
resilient means acting between the output hub and the collar urging the collar into the input hub such that the rotation of the input hub imposed on the collar by such contact will cause the clutch spring to move into contact with the cylindrical clutch surface of the input hub, whereupon the input hub drives the output hub, and
clutch disengagement actuator means selectively actuatably upon the collar to move the collar away from the input hub in opposition to the resilient means and thereby disengaging the clutch.

2. The clutch structure of claim 1 in which the opposed surfaces on the collar and input hubs are planar ring-shaped areas.

3. The clutch structure of claim 1 wherein the clutch disengagement actuator means is an electromagnetic means selectively energizable to act on a portion of the collar providing an armature and acting upon the collar to draw the collar away from the input hub in opposition to the resilient means.

4. The clutch structure of claim 3 in which the electromagnetic means is held stationary by suitable means permitting rotation between the actuator and the output hub.

5. The clutch structure of claim 1 in which the helical clutch spring in relaxed condition is opened out of engagement with the cylindrical input hub clutch surface which it surrounds but is of proper hand to be wrapped down into engagement with the input clutch surface by engagement between the collar and the input hub.

6. The clutch structure of claim 1 in which the helical clutch spring in relaxed condition is opened inwardly away from an input clutch surface which surrounds the spring and which due to the hand of the spring is expanded outwardly when the input hub engages the collar.

7. The clutch structure of claim 1 in which mechanical means is provided to act upon the collar to move it axially away from the input hub.

8. The clutch structure of claim 7 in which the mechanical means is fixed to nonrotating structure movable relative thereto into the moving structure of the collar.

9. The clutch structure of claim 1 wherein the collar is an annular planar structure urged laterally into the input hub by auxiliary spring means separate from the clutch spring.

10. The clutch structure of claim 1 in which the collar is urged into the input hub by the clutch spring which provides an axial bias as well as a radial bias.

* * * * *